(12) United States Patent
Van Horn et al.

(10) Patent No.: US 8,623,235 B2
(45) Date of Patent: Jan. 7, 2014

(54) BLOCK COPOLYMER OIL RETURN AGENTS

(75) Inventors: Brett L. Van Horn, King of Prussia, PA (US); Christopher A. Bertelo, Doylestown, PA (US); Scott C. Schmidt, West Chester, PA (US); Noah E. Macy, Royersford, PA (US); George J. Papakonstantopoulos, King of Prussia, PA (US)

(73) Assignee: Arkema Inc., King of Prussia, PA (US)

( * ) Notice: Subject to any disclaimer, the term of this patent is extended or adjusted under 35 U.S.C. 154(b) by 402 days.

(21) Appl. No.: 12/920,522

(22) PCT Filed: Feb. 18, 2009

(86) PCT No.: PCT/US2009/034348
§ 371 (c)(1),
(2), (4) Date: Sep. 1, 2010

(87) PCT Pub. No.: WO2009/108547
PCT Pub. Date: Sep. 3, 2009

(65) Prior Publication Data
US 2011/0006248 A1    Jan. 13, 2011

Related U.S. Application Data

(60) Provisional application No. 61/032,523, filed on Feb. 29, 2008.

(51) Int. Cl.
*C09K 5/04* (2006.01)

(52) U.S. Cl.
USPC .......................................................... 252/68

(58) Field of Classification Search
USPC .......................................................... 252/68
See application file for complete search history.

(56) References Cited

U.S. PATENT DOCUMENTS

| | | |
|---|---|---|
| 3,085,918 A | 4/1963 | Sherliker et al. |
| 6,299,792 B1 | 10/2001 | Feiring et al. |
| 6,516,837 B2 | 2/2003 | Thomas et al. |
| 7,279,451 B2 | 10/2007 | Singh et al. |
| 2004/0229966 A1* | 11/2004 | Dontula et al. ................. 521/50 |
| 2004/0229968 A1* | 11/2004 | Dontula et al. ................. 521/79 |
| 2005/0178998 A1 | 8/2005 | Minor |
| 2007/0032391 A1* | 2/2007 | Tagawa et al. ................ 508/421 |
| 2007/0082827 A1 | 4/2007 | Schmidt et al. |
| 2008/0281012 A1* | 11/2008 | Van Horn ....................... 521/139 |
| 2012/0223269 A1* | 9/2012 | Van Horn et al. ............... 252/68 |

FOREIGN PATENT DOCUMENTS

WO    WO 2007/084665    7/2007

* cited by examiner

*Primary Examiner* — Douglas McGinty
(74) *Attorney, Agent, or Firm* — Steven D. Boyd

(57) ABSTRACT

The present invention relates to fluorine free polymeric oil-return agents that increase the miscibility of lubricants such as mineral oils and/or oxygenated lubricants with refrigerants in order to improve oil return and system performance of refrigeration systems. It was discovered that fluorine free block copolymers having a block compatible with the oil phase, and at least one block compatible with the refrigerant phase can effectively compatibilize lubricating oils with HFC and HFO refrigerants.

20 Claims, No Drawings

BLOCK COPOLYMER OIL RETURN AGENTS

FIELD OF THE INVENTION

The present invention relates to polymeric oil-return agents which solubilize or disperse mineral oil and/or synthetic oil lubricants with hydrofluorocarbon, hydrochlorofluorocarbon, and hydrofluoroolefin-based refrigerants and refrigerant compositions containing them. The polymeric oil-return agents are fluorine free, block copolymers having at least one block compatible with the oil phase and at least one block compatible with the refrigerant phase. The fluorine free, block copolymer oil-return agents provide for more efficient return of mineral oil and/or synthetic oil lubricants from non-compressor zones back to a compressor zone in a refrigeration system.

BACKGROUND OF THE INVENTION

Most refrigeration compressors use mineral oil lubricants with chlorofluorocarbon (CFC) and hydrochlorofluorocarbon (HCFC) refrigerants. In addition to being inexpensive and rugged lubricants, mineral oils are miscible with CFCs and HCFCs, which is important in providing good oil return. In a system with poor oil return, the oil that leaves the compressor collects at various points in the refrigeration system and does not return to the compressor, leading to clogging, poor lubrication, and decreased efficiency.

With the continued regulatory pressure limiting the use of ozone depleting substances, the refrigeration industry has been moving to non-ozone depleting hydrofluorocarbon (HFC) based refrigerants. HFCs, however, lack the miscibility with traditional lubricants such as mineral oils necessary to provide adequate performance. This has resulted in the implementation of oxygenated lubricants such as polyol ester (POE) oil, polyalkylene glycol (PAG) oil, and polyvinyl ether (PVE) oil. These new lubricants can be considerably more expensive than traditional mineral oil lubricants and can be extremely hygroscopic. Their combination with water can result in the undesirable formation of acids that can corrode parts of the refrigeration system and lead to the formation of sludges. Consequently, there is a need and opportunity to resolve this low solubility and oil return problem so that the refrigeration industry may utilize HFC-based refrigerants with mineral oil and/or oxygenated lubricants.

U.S. Pat. No. 6,516,837 discloses a method of introducing refrigerants into refrigeration systems where a chlorine-containing refrigerant is removed while the lubricant is retained and a composition comprising a refrigerant, a surfactant and a solubilizing agent is introduced into the system. The patent discloses that the surfactants and solubilizing agents are needed because many non-chlorine-containing refrigerants, including HFC's, are relatively insoluble and/or immiscible in the types of lubricants traditionally used such as mineral oil and alkylbenzenes or polyolefins.

U.S. Pat. No. 6,299,792 discloses a halogenated hydrocarbon refrigerant composition comprising a halogenated hydrocarbon, oil, an oil-return agent and optionally an oil-return agent carrier. The oil return agents disclosed are random fluorinated copolymers.

The present invention addresses these needs of the refrigeration industry by providing polymeric oil-return agents which create a solution or stabilized dispersion of lubricant oil with HFC, HFO, and/or HCFC-based refrigerants, permitting improved lubricant oil transport through a refrigeration system and lubricant oil return back to the refrigeration system compressor from other refrigeration system zones. The polymeric oil-return agents of the present invention are effective when used in combinations with conventional mineral oils and/or oxygenated oils.

SUMMARY OF THE INVENTION

The present invention provides for polymeric oil-return agents that increase the miscibility of lubricants such as mineral oils and/or oxygenated lubricants with halogenated refrigerants, including hydrofluorocarbon (HFC) and hydrofluoroolefin (HFO) refrigerants, in order to improve oil return and system performance of refrigeration systems. It was discovered that fluorine free, block copolymers can effectively compatibilize mineral oils and/or oxygenated lubricant oils with HFC refrigerants. The fluorine free, block copolymers are comprised of at least one fluorine free, block, A, compatible with the oil phase, and at least one fluorine free, block, B, compatible with the refrigerant phase. The fluorine free, block copolymers of the present invention include diblock copolymers, triblock copolymers, multiblock copolymers, star copolymers, comb copolymers, gradient containing block copolymers, and other copolymers having a blocky structure, which will be known by those skilled in the art. Preferable diblock and triblock copolymers include A-B and A-B-A block copolymers.

DETAILED DESCRIPTION OF THE INVENTION

The present invention is directed toward the use of fluorine free, block copolymers as oil-return agents in refrigerant systems. The fluorine free, block copolymers of the present invention are preferably those formed by controlled radical polymerization (CRP). Included as fluorine free, block copolymers of the present invention are diblock copolymers, triblock copolymers, multiblock copolymers, star copolymers, comb copolymers, gradient containing block copolymers, and other copolymers having a blocky structure, which will be known by those skilled in the art. Fluorine free, as used herein, means that the block copolymers of the present invention do not contain substantial amounts of fluorine substitution on either of the monomer units. That is, the copolymer is substantially fluorine free. Trace or small amounts of fluorine may be present in amounts that do not adversely impact on the efficacy of the copolymers of the present invention as oil return agents.

When a copolymer segment is synthesized using a CRP technique such as nitroxide-mediated polymerization, it is often termed a gradient or profiled copolymer. This type of copolymer is different than a copolymer obtained by a traditional free radical process where due to the constant production of free radicals throughout the reaction, the composition of the chains will be non-uniform. During a controlled radical polymerization the chains remain active throughout the polymerization (i.e., the monomer mix is not static over the lifetime of the growing chain), thus the composition of the chain is uniform and is dependant on the corresponding monomer mix with respect to the reaction time.

An example of a gradient containing block copolymer is when the monomer or monomers used from one segment are allowed to further react as a minor component in the next sequential segment. For example, if the monomer mix used for the $1^{st}$ block (A block) of an AB diblock copolymer is polymerized to only 80% conversion, then the remaining 20% of the unreacted monomer is allowed to react with the new monomers added for the B block segment the result is an AB diblock copolymer in which the B segment contains a gradient of the A segment composition.

In the present invention, fluorine free, block copolymers also include non-random statistical copolymers. The statistical copolymers can have significant sequences of the same repeat unit and therefore have a blocky structure, with sections of A-blocks and other sections of B-blocks. The statistical polymers of the present invention preferably have gradient distributions of A-block and B-block sequences. Statistical copolymers of the present invention are designated as A-st-B if prepared from A-type and B-type monomers. The statistical nature is preferably imparted by a controlled radical polymerization process.

In the present invention, fluorine free, block copolymers can also be prepared when individual monomer units can themselves be considered as either an A-block or a B-block. A non-limiting example is that the alkyl chain of an alkyl methacrylate monomer can be considered as an individual block if it is sufficiently large enough. For instance, lauryl methacrylate can be considered as having a C12-alkyl A-block such that a linear copolymer prepared from lauryl methacrylate as one of the monomers can be viewed as having short A-block side-chains of C12 alkyl groups. Other block-type monomers include reactive oligomers and macromers.

Fluorine free, block copolymers of the present invention can also be combinations of the various types of block copolymers. A non-limiting example of such would be an A-(A-st-B) copolymer containing an A-block and a section that is a statistical copolymer of A and B segments.

In the present invention the A-block can be of any polymer that is compatible with the oil phase, preferably comprising an fluorine free, acrylate- or methacrylate-based polymer, more preferably a fluorine free, acrylate or methacrylate-based polymer with an alkyl group of four to sixteen carbons, even more preferably with a fluorine free, alkyl group of ten to twenty carbons, and even more preferably a polymer comprising lauryl acrylate and/or lauryl methacrylate. The B-block can be any fluorine free, polymer compatible with the refrigerant and is preferably a fluorine free, acrylate- or methacrylate-based polymer, more preferably a second fluorine free, acrylate-based polymer, even more preferably a second fluorine free, acrylate based polymer with an alkyl group of from one to eight carbons, and even more preferably a polymer comprising butyl acrylate. The first polymer must be different than the second polymer.

The present invention is directed towards use of such copolymers as additives to compatibilize lubricating oils with refrigerants and also towards compositions comprising oil and additive as either an additive concentrate or as a lubricant composition, compositions comprising oil, additive, and refrigerant, the use of the additive and the compositions comprising the additive, etc. In compositions comprising oil and additive, the present invention is directed towards lubricant compositions comprising oil and additive with an amount of additive effective at increasing the miscibility or solubility of refrigerant with oil, preferably between about 0.01 and 99 wt % additive in oil, more preferably between about 0.05 and 50 wt % additive in oil, even more preferably between about 0.1 and 20 wt % additive in oil, and even more preferably between about 0.5 and 10 wt % additive in oil. Where an additive concentrate is in oil, the preferred compositions would be from about 10 wt % to about 80 wt % additive in oil.

The halogenated hydrocarbons of the present invention preferably comprise hydrofluorocarbon (HFC) refrigerants. The HFC refrigerants may be single component refrigerants or as part of a refrigerant blend. HFC refrigerants and refrigerant blends preferably include: R-134a, R-32, R-410A, R-404A, R-427A, R-422D, R-422A, R-407C, R-417A, R-507A. Other refrigerants and refrigerant blends containing HFC refrigerants are also embodied by the present invention, including, but not limited to, R-134a, R-32, R-23, R-125, R-143a, R-152a, R-143, R-152, R-134, R-245fa, R-227ea, and mixtures thereof; HFC containing refrigerant blends also containing HCFC refrigerants, including R-408A, R-409A, and other blends of HFC refrigerants incorporating HCFC refrigerants, such as R-22, R-142b, R-124, R-123, R-141b; HFC containing refrigerant blends also containing hydrocarbons such as R-422D, R-422A, R-417A, R-424A, and other blends of HFC refrigerants incorporating hydrocarbons such as propane, butane, isobutane, n-pentane, iso-pentane, neo-pentane, and cyclopentane. Halogenated hydrocarbons of the present invention also include, but are not limited to, hydrofluoroolefins, such as HFO-1234yf, (E- and/or Z-) HFO-1234ze, HFO-1243zf, (E- and/or Z-) HFO-1225ye, (E- and/or Z-) HFO-1336mzz, and mixtures thereof. The hydrofluorocarbons of the present invention may also contain oxygen, including, but not limited to, hydrofluoroethers. The compositions of the present invention can also comprise additional components such as viscosity modifiers, antioxidants, stabilizers, dyes, anti-foaming agents, foaming agents, surfactants, nanoparticles, corrosion inhibitors, radical scavengers, other lubricants, etc.

In making the fluorine free, block copolymers of the present invention, any polymerization technique familiar to those skilled in the art can be used. The preferred method is controlled radical polymerization, most preferably nitroxide-mediated controlled radical polymerization.

The present compositions comprising halogenated hydrocarbon and fluorine free, block copolymer oil-return agent also find utility as cleaning agents to remove hydrocarbon oils and soldering fluxes from solid surfaces. Halogenated hydrocarbons may have limited oil solubility and addition of the block copolymer oil-return agents of the present invention to such halogenated hydrocarbons enhances the ability of halogenated hydrocarbons, particularly hydrofluorocarbons, to at least partially dissolve and thus remove oil and soldering fluxes from surfaces.

Thus, the present invention is further related to processes for vapor phase degreasing and solvent cleaning using the present compositions comprising halogenated hydrocarbon and fluorine free, block copolymer oil-return agent. Such vapor degreasing processes comprise contacting a substrate to be cleaned, e.g., residue contaminated, silicon-metal composite electronic circuit boards, metal (e.g. stainless steel) fabricated parts and the like, with the present halogenated halocarbon/block copolymer oil-return compositions in a liquid phase, and further, the halogenated hydrocarbon vapors resulting from boiling such compositions. Halogenated hydrocarbon vapors condensing on the substrate provide clean distilled halogenated hydrocarbon which further rinses away remaining oil-return agent and flux or other residue. Evaporation of halogenated hydrocarbon from the substrate leaves behind no residue. The present solvent cleaning processes comprise contacting a substrate to be cleaned with liquid phase present composition comprising block copolymer oil-return agent and then removal of the substrate from the composition. For difficult to remove soils and oils where elevated temperature is necessary to improve the cleaning action of the solvent, or for large volume assembly line operations where the cleaning of substrates must be done efficiently and quickly, the conventional operation of a vapor degreaser consists of immersing the part to be cleaned in a sump of boiling solvent which removes the bulk of the soil, thereafter immersing the part in a sump containing freshly distilled solvent near room temperature, and finally exposing the part to solvent vapors over the boiling sump which condense on the cleaned part. In addition, the part can also be sprayed with distilled solvent before final rinsing. Vapor degreasers suitable in the above-described processes are well known in the art. For example, Sherliker et al. in U.S. Pat. No. 3,085,918, disclose such suitable vapor degreasers comprising a boiling sump, a clean sump, a water separator, and other ancillary equipment.

The present compositions comprising a halogenated hydrocarbon and fluorine free, block copolymer oil-return agent are effective in removing hydrocarbon oil and soldering flux residues from a broad range of substrates including metals, such as tungsten, copper, gold, beryllium, stainless steel, aluminum alloys, brass and the like; from glasses and ceramic surfaces, such as glass, sapphire, borosilicate glass, alumina, silica such as silicon wafers used in electronic circuits, fired alumina and the like; and from plastics such as polyolefin ("Alathon", Rynite®, "Tenite"), polyvinylchloride, polystyrene ("Styron"), polytetrafluoroethylene (Teflon®), tetrafluoroethylene-ethylene copolymers (Tefzel®), polyvinylidenefluoride ("Kynar"), ionomers (Surlyn®), acrylonitrile-butadiene-styrene polymers (Kralac®), phenol-formaldehyde copolymers, cellulosic ("Ethocel"), epoxy resins, polyacetal (Delrin®), poly(p-phenylene oxide) (Noryl®), polyetherketone ("Ultrapek"), polyetheretherketone ("Victrex"), poly(butylene terephthalate) ("Valox"), polyarylate (Arylon®), liquid crystal polymer, polyimide (Vespel®), polyetherimides ("Ultem"), polyamideimides ("Torlon"), poly(p-phenylene sulfide) ("Rython"), polysulfone ("Udel"), and polyaryl sulfone ("Rydel").

The following examples are representative of the present invention and not to be considered limiting.

EXAMPLES

Exemplary refrigerants used in the following examples include:
- R-404A, a refrigerant blend containing 44% R-125 (pentafluoroethane), 52% R-143a (1,1,1-trifluoroethane), and 4% R-134a (1,1,1,2-tetrafluoroethane)
- R-22 (chloro-difluoromethane)
- R-422D, a refrigerant blend containing 65.1% R-125, 31.5% R-134a, and 3.4% R-600a (isobutane).
- R-427A, a refrigerant blend containing 15% R-32 (difluoromethane), 25% R-125, 10% R-143a, and 50% R-134a.
- R-407C, a refrigerant blend containing 23% R-32, 25% R-125, and 52% R-134a.

Exemplary common lubricating oils used in the following examples include:
- MO-150: 150 SUS viscosity mineral oil (National Refrigerants Inc., produced by Witco Corp.)
- MO-300: 300 SUS viscosity mineral oil (National Refrigerants Inc., produced by Witco Corp.)
- MO-70: 70 SUS viscosity mineral oil (Science Lab.com. Light Viscosity Range Mineral Oil NF. CAS #8012-95-1)
- AB-150: 150 SUS viscosity synthetic alkyl benzene oil (National Refrigerants Inc., CAS #68855-24-3)
- POE-22: 22 centistoke viscosity polyol ester oil (Copeland Ultra 22CC, produced by Mobile).

Synthesized polymer additives were prepared using nitroxide mediated controlled radical polymerization (nitroxide mediated CRP), though any appropriate synthesis method could be used. The polymer additives are used as polymeric oil-return agents. The polymers synthesized include various homopolymers, diblock copolymers, triblock copolymers, and statistical copolymers. Table 1 shows a list of fluorine free and comparative fluorine containing copolymers synthesized by CRP using the following monomers: butyl acrylate (BA), lauryl acrylate (LA), lauryl methacrylate (LMA), 2-ethyl hexylacrylate (EHA), hydroxyethyl acrylate (HEA), poly (propylene glycol) acrylate (PPGA), heptafluorobutyl acrylate (F7BA), pentafluoro-isopropyl acrylate (F5iC3), hexafluoro-isopropyl acrylate (F6iC3), 2-fluoroethyl acrylate (FEA), trifluoroethyl acrylate (TFEA), Zonyl®-TM (a fluoromethacrylate from Dupont) and Zonyl®-TA-N (a fluoroacrylate from DuPont). (C12-C16)MA designates a mixture of methacrylate monomers where the alkyl group contains from 12 to 16 carbons.

Two descriptions are provided for each polymer. For Description A, a diblock copolymer is designated at PX-PY ($Mn_x$-$Mn_y$), where PBA-PLMA (2.1 k-6.3 k) is diblock copolymer of poly(butyl acrylate) and poly(lauryl methacrylate) where the molecule weight of the PBA block is 2.1 kg/mol and the molecule weight of the PLMA block is 6.3 kg/mol. A triblock copolymer is similarly designated as PY-PX-PY ($Mn_y$-$Mn_x$-$Mn_y$). Statistical copolymers are designated as P(X-st-Y) (Mn) % X-%Y, where P(BA-st-LMA) (12 k) 62-38 designates a statistical copolymer of butyl acrylate and lauryl methacrylate with an overall molecular weight of 12 kg/mol containing 62 wt % BA and 38 wt % LMA. Combinations can also be designated, such as P(BA-st-TFEA (5%)-PLMA (6.5 k-5.4 k) which is diblock coplymer where the first block is statistical copolymer of butyal acrylate with 5 wt % trifluoroethyl acrylate with a block molecular weight of 6.5 kg/mol. For Description B, molecular weights are rounded to the nearest kg/mol and the nomenclature is shortened. For instance PBA-PLMA (7.9 k-6 k) becomes PBA-PLMA-8/6 and P(BA-st-LMA) (7.3 k) 33-67 becomes P(BA/33-s-LMA/67)-7.

Table 1 also provides the fluorine content of the polymers in terms of the wt. % fluoroine.

TABLE 1

Polymers Synthesized by CRP

| Description | | |
| --- | --- | --- |
| A | B | F Content |
| PBA-PLMA (2.1k-6.3k) | PBA-LMA-2/6 | 0 |
| PBA-PLMA (7.9k-6k) | PBA-LMA-8/6 | 0 |
| PBA-PLMA (22k-13k) | PBA-PLMA-22/13 | 0 |
| PBA-PLMA (39k-17k) | PBA-PLMA-39/17 | 0 |
| PBA-PLMA (56k-31k) | PBA-PLMA-56/31 | 0 |
| PBA-PLMA (87k-14k) | PBA-PLMA-87/14 | 0 |
| PBA-PLMA (87k-40k) | PBA-PLMA-87/40 | 0 |
| P(BA-st-LMA) (34k) 44-56 | P(BA/44-s-LMA/56)-34 | 0 |
| P(BA-st-LMA) (11k) 29-71 | P(BA/29-s-LMA/71)-11 | 0 |
| P(BA-st-LMA) (12k) 50-50 | P(BA/50-s-LMA/50)-12 | 0 |

TABLE 1-continued

Polymers Synthesized by CRP

Description

| A | B | F Content |
|---|---|---|
| P(BA-st-LMA) (12k) 62-38 | P(BA/62-s-LMA/38)-12 | 0 |
| P(BA-st-LMA) (7.3k) 33-67 | P(BA/33-s-LMA/67)-7 | 0 |
| P(BA-st-LMA) (7.1k) 46-54 | P(BA/46-s-LMA/54)-7 | 0 |
| P(BA-st-LMA) (9.1k) 20-80 | P(BA/20-s-LMA/80)-9 | 0 |
| P(BA-st-LMA) (7.1k) 23-77 | P(BA/23-s-LMA/77)-7 | 0 |
| PLMA-PBA-PLMA (4k-4k-4k) | PLMA-PBA-PLMA-4/4/4 | 0 |
| P(C12-C16)MA-PBA-P(C12-C16)MA (1.6k-6.6k-1.6k) | P(C12-C16)MA-PBA-P(C12-C16)MA-2/6/2 | 0 |
| PLMA-PLA-PLMA (3.3k-13.5k-3.3k) | PLMA-PLA-PLMA-3/14/3 | 0 |
| PBA-PLA-PBA (2.2k-11k-2.2k) | PBA-PLA-PBA-2/11/2 | 0 |
| PBA-PLA (4.7k-4.9k) | PBA-PLA-5/5 | 0 |
| P(PGA-st-LMA) (4.5) 51-49 | P(PGA/51-s-LMA/49)-5 | 0 |
| P(PGA-st-LMA) (8.9) 50-50 | P(PGA/50-s-LMA/50)-9 | 0 |
| PPGA-PLMA (4.8k-5k) | PPGA-PLMA-5/5 | 0 |
| PHEA-PLMA (5k-5k) | PHEA-PLMA-5/k | 0 |
| P(HEA-st-LMA) (4.6k) 50-50 | P(HEA/50-s-LMA/50)-5 | 0 |
| P(BA-st-TFEA(5%))-PLMA (6.5k-5.4k) | P(BA/95-s-TFEA/5)-PLMA-6/5 | 1% |
| P(BA-st-Zonyl ® TM(5%))-PLMA (6.5k-5.8k) | P(BA/95-s-ZonylTM/5)-PLMA-6/6 | 1.6% |
| P(F7BA)-PLMA (4.2k-5k) | P(F7BA)-PLMA-4/5 | 23.9% |
| P(F6-iC3 Acrylate)-PLMA (5k-4k) | P(F6iC3)-PLMA-5/4 | 28.5% |
| P(F5-iC3 Arcylate)-PLMA (5k-4.8k) | P(F5iC3)-PLMA-5/5 | 23.7% |
| P(Zonyl ®TA-N)-PLMA (5k-5k) | P(ZonylTAN)-PLMA-5/5 | 31.8% |
| P(Zonyl ®TM-st-LMA) (12k) 50-50 | P(ZonylTM/50-LMA/50)-12 | 34.4% |
| P(Zonyl ®TM-st-LMA) (8k) 58-42 | P(ZonylTM/58-s-LMA/42)-8 | 36.5% |
| P(FEA-st-LMA) (12k) 53-47 | P(FEA/58-s-LMA/42)-12 | 8.6% |

Lubricants were prepared by blending a fraction of a polymeric oil-return agent to mineral oil. Blending could be assisted with gentle heating. Blends were prepared from 0 wt % to 100 wt % polymeric additive in oil. For most lubricants, the blend was prepared at 4% to 5.5 wt % polymer additive. The appearance of lubricants was noted, both just after preparation and up to around one year following preparation. Lubricants that appeared cloudy may remain stable for days or weeks, but after several months most all would display signs of settling or flocculation, evidenced by the lubricant being clear near the surface while becoming cloudier towards the bottom. The cases where the polymeric additive was immiscible with the oil or where it flocculated quickly were also noted.

Refrigerant/Oil Miscibility Test

To determine the miscibility limit of a refrigerant in a lubricant, a known quantity of lubricant was loaded into a calibrated glass pressure vessel. A slight vacuum was pulled on the vessel to remove excess air. Using a high pressure syringe pump, refrigerant was incrementally added to the pressure vessel. After each addition of liquid refrigerant, the refrigerant and lubricant were mixed and then allowed to stand for several minutes after which the number of liquid phases in the pressure vessel was visually observed. The composition where mixture transitions from one phase to two distinct liquid phases is the miscibility limit, and is reported as the weight percent (wt %) of refrigerant in the liquid composition. The miscibility limit may also be identified by starting with a two-phase mixture containing excess refrigerant whereby refrigerant is carefully vented from the vessel in increments until a one-phase composition is achieved. The miscibility tests of the following examples were conducted at ambient temperature.

Polymeric Oil-Return Agents of Fluorine Free Butyl Acrylate and Lauryl Methacrylate Examples 1 Through 16

Refrigerant/oil miscibility tests were conducted using the procedure outlined above.

Example 1 gives the miscibility of R-404A in mineral oil (MO-150), which was found to about around 5 wt % R-404A at ambient temperature. Examples 2 through 16 demonstrate the effect of adding from 4% to 5.5 wt % of polymeric additives of butyl acrylate and lauryl methacrylate to the mineral oil (MO-150). When using the diblock copolymers of examples 2 through 8, it can be seen that clear lubricant blends can be produced, even with high molecular weight additives (Mw>100 kg/mol). The greatest increase in R-404A miscibility was observed using additives with Mw<40 kg/mol.

Examples 9 through 15 are with lubricants prepared from fluorine free, statistical copolymers of BA and LMA. All of the lubricants prepared with the statistical copolymer of BA and LMA were clear in appearance and provided for an increase in the miscibility limit of R-404A. The greatest increase in R-404A miscibility was observed with the statistical copolymers with Mw between about 8 and 12 kg/mol containing less than 50% BA.

Example 16 is using a PLMA-PBA-PLMA triblock copolymer. The lubricant was cloudy but provided a significant increase in R-404A miscibility.

TABLE 2

Miscibility Limit of R-404A in Mineral Oil Lubricant Blends

| Example | Additive used (4-5.5 wt % in MO-150) | Miscibility Limit (wt % R-404A) | Lubricant Appearance |
|---|---|---|---|
| 1 | NONE | 5 | Clear |
| 2 | PBA-LMA-2/6 | 8 | Clear |
| 3 | PBA-LMA-8/6 | 5 to 8 | Clear or Cloudy |
| 4 | PBA-PLMA-22/13 | 12 | Cloudy |
| 5 | PBA-PLMA-39/17 | 5.5 | Clear |

TABLE 2-continued

Miscibility Limit of R-404A in Mineral Oil Lubricant Blends

| Example | Additive used (4-5.5 wt % in MO-150) | Miscibility Limit (wt % R-404A) | Lubricant Appearance |
|---|---|---|---|
| 6 | PBA-PLMA-56/31 | 5.5 | Clear |
| 7 | PBA-PLMA-87/14 | 5 | Clear, blue tint |
| 8 | PBA-PLMA-87/40 | 5 | Clear, blue tint |
| 9 | P(BA/44-s-LMA/56)-34 | 7.5 | Clear |
| 10 | P(BA/29-s-LMA/71)-11 | 8 | Clear |
| 11 | P(BA/50-s-LMA/50)-12 | 9 | Clear |
| 12 | P(BA/62-s-LMA/38)-12 | 5.5 | Clear |
| 13 | P(BA/33-s-LMA/67)-7 | 7.5 | Clear |
| 14 | P(BA/46-s-LMA/54)-7 | 8 | Clear |
| 15 | P(BA/20-s-LMA/80)-9 | 12 | Clear |
| 16 | PLMA-PBA-PLMA-4/4/4 | 12 | Cloudy |

Polymeric Oil-Return Agents Containing Fluorine

Examples 17 Through 22

Refrigerant/Oil miscibility tests were conducted the same as in Examples 1 through 16. Lubricants were prepared with about 4% to 5.5 wt % polymeric additive in mineral oil except where noted.

Examples 17 and 18 were using diblock copolymers of BA and LMA but where the BA block contained approximately 5 wt % of a fluorinated monomer, either trifluoroethyl acrlate or Zonyl-TM. Addition of the fluorinated monomer provided for an efficient increase in the R-404A miscibility limit, but also increased the cloudiness of the lubricant.

Examples 19, 20, and 21 where block and statistical copolymers containing a significant fraction of fluorine of between 31 wt % and 37 wt %. Example 19 was essentially immiscible with mineral oil and could not be used for refrigerant miscibility studies. Examples 20 and 21 either displayed excessive foaming or flocculation and also could not be effectively used for refrigerant miscibility testing. Example 24, not shown in Table 3, was a lubricant blend prepared using P(Zonyl™/58-s-LMA/42)-8 at only 2.7 wt % in MO-150 The lubricant was less cloudy than example 21 and exhibited less foaming. The results indicate that a high degree of fluorination can make the polymeric oil-return agent less compatible with the mineral oil.

Example 22 was using a statistical copolymer of 2-fluoroethyl acrylate and lauryl methacrylate. Though the fluorine content of the polymer was relatively low it was still immiscible with mineral oil and could not be used for refrigerant/oil miscibility testing.

The data shows that increasing the fluorine content of the polymer tends to decreases its compatibility with mineral oil.

TABLE 3

Miscibility Limit of R-404A in Mineral Oil Lubricant Blends

| Example | Additive used (4-5.5 wt % in MO-150) | F Content of Additive | Miscibility Limit (wt % R-404A) | Lubricant Appearance |
|---|---|---|---|---|
| 1 | NONE | — | 5 | Clear |
| 17 | P(BA/95-s-TFEA/5)-PLMA-6/5 | 1% | 10.5 | Cloudy |
| 18 | P(BA/95-s-Zonyl™/5)-PLMA-6/6 | 1.6% | 10.5 | Cloudy |
| 19 | P(ZonylTAN)-PLMA-5/5 | 31.8% | — | Cloudy, immiscible |
| 20 | P(Zonyl™/50-LMA/50)-12 | 34.4% | — | Cloudy, sediment |
| 21 | P(Zonyl™/58-s-LMA/42)-8 | 36.5% | — | Cloudy, foaming |
| 22 | P(FEA/53-s-LMA/47)-12 | 8.6% | | immiscible |

Examples 23 Through 29

Examples 23, 24 and 25: Lubricant blends were prepared using MO-150 with P(PGA/51-s-LMA/49)-5, P(PGA/50-s-LMA/50)-9, and PPGA-PLMA-5/5 each at 4% to 5.5 wt % polymer additive in oil. The lubricants were cloudy but showed a noticeable increase in the miscibility limit of R-404A when tested using the refrigerant/oil miscibility test described previously.

Example 26: A lubricant blend was prepared with around 4% to 5.5 wt % P(C12-C16)MA-PBA-P(C12-C16)MA-2/6/2 in MO-70. The lubricant was clear and showed an improvement in the miscibility limit of R-404A when tested using the refrigerant/oil miscibility test described previously.

Examples 27, 28 and 29: Lubricant blends were prepared using MO-150 with 4% to 5.5 wt % each of the PLMA-PLA-PLMA-3/14/3, PBA-PLA-PBA-2/11/2, PBA-PLA-5/5 polymeric additives. The lubricant blend prepared with the PLMA-PLA-PLMA-3/14/3 was slightly cloudy, the lubricant blend prepared with the PBA-PLA-PBA-2/11/2 was cloudy, while the lubricant blend prepared with the PBA-PLA-5/5 was clear.

Example 30. A lubricant was prepared using MO-150 and approximately 5 wt % of Arlacel™ P-135, a poly(12-hydroxystearic acid)-polyethylene oxide block copolymer. The lubricant was clear and tested using the refrigerant/oil miscibility test described previously using R-404A. The Arlacel P-135 increased the miscibility but to a level less than 8.5 wt % R-404A in MO-150.

Example 31. A lubricant was prepared using MO-150 with approximately 2 wt % of an alkylbenzene oil, 3 wt % of a polyol ester oil, and 4 wt % of P(BA/22-s-LMA/77)-7. The lubricant was cloudy. The lubricant was tested using the refrigerant/oil miscibility test described previously using R-404A. The miscibility limit was increased to around 9.5 wt % R-404A in the lubricant.

Variation in Polymeric Oil-Return Agent Concentration

Examples 32 to 37: Lubricant blends were prepared in MO-150 and the P(BA/23-s-LMA/77)-7 statistical copolymer at concentrations of about 3 wt %, 5 wt %, 7 wt %, 9 wt %, 10 wt %, and 14 wt %. The lubricant blends were all clear. The lubricants were each tested using the refrigerant/miscibility test described previously using R-404A as the refrigerant. All showed an increased miscibility limit over using pure mineral oil. Example 32, at 3 wt % P(BA/23-s-LMA/77)-7 increased the miscibility limit up to about 7 wt %. Examples 33, 35, 36 and 37 at 5 wt %, 9 wt %, 10 wt %, and 14 wt % of P(BA/23-s-LMA/77)-7 respectively, all increased the miscibility limit to around 9 wt % R-404A in lubricant. Example 34, at about 7 wt % P(BA/23-s-LMA/77)-7 increased the miscibility limit of R-404A to between 9 and 10 wt %.

Examples 38 to 41: Lubricant blends were prepared in MO-150 and the PLMA-PBA-PBA-4/4/4 statistical copolymer at concentrations of about 0.4 wt %, 2 wt %, 4 wt %, and 6 wt %. The blends were tested in refrigerant/oil miscibility tests as described previously. At only 0.4 wt %, example 38, there was no significant observed impact on the miscibility limit of R-404A in mineral. As the concentration was increased to 2 wt %, 4 wt %, and to 6 wt % in examples 39, 40 and 41 respectively, the miscibility limit of R-404A in the lubricant also increased to around 12 wt %.

Polymeric Oil-Return Concentrates

Example 42: A polymeric oil-return concentrate was prepared by blending about 27 wt % MO-70 with 73 wt % P(BA/25-s-LMA/75)-8. The concentrate was clear, stable in storage, and easily diluted to lower additive concentrations by the addition of further mineral oil. The viscosity of the formulated lubricant could be adjusted during dilution by blending with mineral oils with various viscosities. This was done with MO-70, MO-150, and MO-300, though other viscosity oils could be used or other oils besides mineral oil, such as PVE, POE, PAG, alkyl benzene, and mixtures thereof.

Refrigeration Equipment Testing

Refrigeration equipment testing was performed in a environmentally controlled facility that consists of side-by-side insulated chambers designed for the testing of air-conditioning and refrigeration equipment. Each chamber uses independent control systems to regulate temperature, humidity, and airflow to characterize the performance of full-scale HVACR systems under a wide range of environmental conditions. The system was installed with a medium-to-low temperature Walk-in-Cooler type R-22 refrigeration system. This system is driven by a 1½ HP, semi-hermetic, Copeland compressor, with a matched Bohn evaporator and Sporlan thermostatic expansion valve. Pressure transducers and resistance temperature detectors are installed throughout to determine the refrigerant state at key points in the system. A Coriolis meter is used to measure refrigerant flow rates, while wattmeters are used to measure power consumption of the system and its components. Finally, a video camera is used to remotely monitor the oil levels in the compressor sight glass.

System performance could be evaluated at various system conditions. Oil return was evaluated by monitoring the oil level in the compressor sight glass. After startup, the oil level in the compressor may drop below the lower level in the sight glass. If the oil level does not return to within the visible range then additional oil would be added to top off the level in the compressor. If the oil level again dropped below the visible level in the sight glass then the system was considered to fail with respect to oil return. If the oil level stabilized then the system was considered to provide for stable oil return.

Oil logging in the system could also be inferred from the temperature at the evaporator outlet. At equivalent chamber conditions, a lower evaporator outlet is an indication that oil is collecting in and coating the evaporator, insulating it to heat transfer. Therefore, less subcooling between the evaporator outlet and the box temperature is preferred.

Examples 43 Through 47

Equipment Tests Using R-404A

The refrigeration system was charged with R-404A. The testing facility was operated at 80° F. ambient temperature (compressor-side) and 30° F. box temperature (evaporator-side). For comparative examples 43 and 44, the lubricants tested were POE-22 and MO-150 respectively. From Table 4, comparative example 44 clearly shows the problem caused by poor miscibility between the refrigerant and the lubricant, where the oil return failed and the evaporator outlet temperature and refrigerant mass flow rate were significantly lower than when operated using POE-22 as seen in comparative example 43.

For example 45, a lubricant MO-Add-1 was prepared by blending MO-150 with 5 wt % of the PLMA-PBA-PLMA-4/4/4. MO-Add-1 had a viscosity of approximately 225-SUS at 100° F. For example 46, a lubricant MO-Add-2 was prepared by blending a 50/50 mix of MO-150 and MO-70 with 5 wt % of PLMA-PBA-PLMA-4/4/4. MO-Add-2 had a viscosity of approximately 150-SUS at 100° F. For example 47, a lubricant MO-Add-3 was prepared by blending a 50/50 mix of MO-150 and MO-70 with 3 wt % of PLMA-PBA-PLMA-4/4/4 and 3 wt % of a P(BA/50-s-LMA/50)-8. With examples 45, 46 and 47, stable oil return was achieved along with improvement in other operating parameters, with the conditions more closely matching the baseline case when using POE oil, comparative example 43, than when using mineral oil alone. These results clearly show that use of the polymeric oil-return agents of the present invention provide for significant improvement in oil return and system performance.

TABLE 4

Equipment test results using R-404A
80° F. Ambient temperature and 30° F. Box temperature.

| Example | 43 | 44 | 45 | 46 | 47 |
|---|---|---|---|---|---|
| Refrigerant | R-404A | R-404A | R-404A | R-404A | R-404A |
| Lubricant | POE | MO-150 | MO-Add-1 | MO-Add-2 | MO-Add-3 |
| Mass Flow Rate (lbm/min) | 4.67 | 4.27 | 4.44 | 4.46 | 4.36 |
| Compressor Power (W) | 2495 | 2404 | 2501 | 2440 | 2420 |
| Evap Outlet Temp (° F.) | 25.57 | 16.73 | 19.77 | 21.06 | 21.23 |
| Oil Return Status | PASS | FAIL | PASS | PASS | PASS |

Examples 48 Through 50

Equipment Tests Using R-422D

The refrigeration system was charged with R-422D. The testing facility was operated at 80° F. ambient temperature (compressor-side) and 30° F. box temperature (evaporator-side). For comparative examples 48 and 49, the lubricants tested were POE-22 and MO-150. From Table 5, comparative example 49 clearly shows the problem caused by poor miscibility between the refrigerant and the lubricant, where the oil return failed and the evaporator outlet temperature and refrigerant mass flow rate were significantly lower than when operated using POE-22 as see in comparative example 48.

For example 50, the lubricant was MO-Add-2 as used in example 46, which had approximately the same viscosity as MO-150 at 100° F. The results show that use of the polymeric oil-return agent with R-422D, a blend of hydrofluorocarbons and a hydrocarbon, will improve oil return and system performance.

TABLE 5

Equipment test results using R-422D 80° F. Ambient temperature and 30° F. Box temperature.

| Example | 48 | 49 | 50 |
|---|---|---|---|
| Refrigerant | R-422D | R-422D | R-422D |
| Lubricant | POE | MO-150 | MO-Add-2 |
| Mass Flow Rate (lbm/min) | 4.56 | 4.11 | 4.35 |
| Compressor Power (W) | 2201 | 2073 | 2147 |
| Evap Outlet Temp (° F.) | 25.03 | 18.39 | 21.34 |
| Oil Return Status | PASS | FAIL | PASS |

Examples 51 Through 53

Equipment Tests at 0° F. Box Temperature

Example 51: The refrigeration system was operated as in example 46, with R-404A as the refrigerant and MO-Add-2 as the lubricant, except that the box temperature (evaporator-side) was maintained at 0° F. During operation there was an improvement in the evaporator outlet temperature and mass flow rate over when using MO-150.

Example 52. The refrigeration system was operated as in example 50, with R-422D as the refrigerant and MO-Add-2 as the lubricant, except that the box temperature (evaporator-side) was maintained at 0° F. During operation there was an improvement in the evaporator outlet temperature and mass flow rate over when using MO-150.

Example 53: The refrigeration system was operated as in examples 51 and 52, with the box temperature maintained at 0° F., except that the refrigerant was R-427A and the lubricant was MO-Add-3. During operation there was an improvement in the evaporator outlet temperature and mass flow rate over when using MO-150.

While the present invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

The invention claimed is:

1. A refrigerant composition, comprising:
   the halogenated hydrocarbon containing at least one carbon atom and at least one fluorine atom, 1,1,1,2,2 pentafluoroethane;
   at least one oil selected from the group consisting of paraffins, and synthetic paraffins; and
   a fluorine free, polymeric oil-return agent comprising a blocky copolymer formed from at least one first fluorine free lauryl methacrylate polymer that is compatible with said oil and at least one second fluorine free butyl acrylate polymer that is compatible with said halogenated hydrocarbon.

2. The refrigerant composition of claim 1 wherein said fluorine free polymeric oil-return agent is selected from the group consisting of diblock copolymers, triblock copolymers, multiblock copolymers, statistical block copolymers, gradient copolymers, star copolymers, comb copolymers, side-chain copolymers or mixtures thereof.

3. The refrigerant composition of claim 1 where said first fluorine free polymer and/or said second fluorine free polymer are selected from the group consisting of polymers, copolymers and mixtures thereof.

4. The refrigerant composition of claim 1 wherein the ratio of said first fluorine free lauryl methacrylate polymer to said second fluorine free butyl acrylate polymer in said fluorine free polymeric oil-return agent is from about 1:100 to 100:1.

5. The refrigerant composition of claim 1 wherein the ratio of said first fluorine free lauryl methacrylate polymer to said second fluorine free butyl acrylate polymer of said fluorine free polymeric oil-return agent is from about 1:1 to 9:1.

6. The refrigerant composition of claim 1 wherein the ratio of said first fluorine free lauryl methacrylate polymer to said second fluorine free butyl acrylate polymer of said fluorine free polymeric oil-return agent is from about 1:4 to 9:1.

7. The refrigerant composition of claim 1 wherein said fluorine free polymeric oil return agent comprises a statistical copolymer comprising fluorine free butyl acrylate and fluorine free lauryl methacrylate.

8. The refrigerant composition of claim 1 wherein said fluorine free polymeric oil-return agent is selected from the group consisting of a diblock copolymer comprising fluorine free butyl acrylate, fluorine free lauryl methacrylate, a triblock copolymer comprising fluorine free butyl acrylate, fluorine free lauryl methacrylate, and a gradient copolymer comprising fluorine free butyl acrylate, fluorine free lauryl methacrylate.

9. The refrigerant composition of claim 7 where said statistical copolymer has an average molecular weight of from about 1 kg/mol to about 50 kg/mol.

10. The refrigerant composition of claim 8 wherein said diblock copolymer, said triblock copolymer or said gradient copolymer has an average molecular weight of from about 1 kg/mol to about 130 kg/mol.

11. The refrigerant composition of claim 8 where said diblock copolymer, said triblock copolymer or said gradient copolymer has an average molecular weight of from about 1 kg/mol to about 90 kg/mol.

12. The refrigerant composition of claim 8 where said diblock copolymer, said triblock copolymer or said gradient copolymer has an average molecular weight of from about 1 kg/mol to about 40 kg/mol.

13. The refrigerant composition of claim 1 wherein a combination of said at least one oil (b) and said fluorine free polymeric oil-return agent (c) comprises from about 0.01 wt % to about 99 wt % of said fluorine free polymeric oil-return agent (c).

14. The refrigerant composition of claim 1 wherein a combination of said at least one oil (b) and said fluorine free polymeric oil-return agent (c) comprises from about 0.05 wt % to about 50 wt % of said fluorine free polymeric oil-return agent (c) in said at least one oil.

15. The refrigerant composition of claim 1 wherein a combination of said at least one oil (b) and said fluorine free polymeric oil-return agent (c) comprises from about 0.1 wt % to about 20 wt % fluorine free polymeric oil-return agent (c) in said at least one oil (b).

16. The refrigerant composition of claim 1 wherein a combination of said at least one oil (b) and said fluorine free polymeric oil-return agent (c) comprises from about 0.5 wt % to about 10 wt % fluorine free polymeric oil-return agent (c) in said at least one oil (b).

17. The refrigerant composition of claim 1 wherein a combination of said at least one oil (b) and said fluorine free polymeric oil-return agent (c) comprises from about 10 wt % to about 80 wt % fluorine free polymeric oil-return agent (c) in said at least one oil (b).

18. The refrigerant composition of claim 1 further comprising a hydrocarbon.

19. The refrigerant composition of claim 18 wherein said hydrocarbon is selected from the group consisting of propane, butane, isobutane, normal pentane, neopentane, cyclopentane, isopentane and mixtures thereof.

20. The refrigerant composition of claim 1 further comprising an oxygenated lubricating oil selected from the group consisting of polyalkylene glycols, polyol ester oils, polyvinyl ethers and mixtures thereof.

\* \* \* \* \*